United States Patent
Mikulic et al.

(10) Patent No.: US 11,434,907 B2
(45) Date of Patent: Sep. 6, 2022

(54) SCREW COMPRESSOR HAVING AT LEAST ONE CONTROL SLIDE INCLUDING PISTON ROD WITH GUIDE INSERTS

(71) Applicant: BITZER Kuehlmaschinenbau GmbH, Sindelfingen (DE)

(72) Inventors: Tihomir Mikulic, Holzgerlingen (DE); Dominic Kienzle, Renningen (DE); Marcus Pabst, Rottenburg (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 5 days.

(21) Appl. No.: 16/807,939

(22) Filed: Mar. 3, 2020

(65) Prior Publication Data
US 2020/0200170 A1 Jun. 25, 2020

Related U.S. Application Data

(63) Continuation of application No. PCT/EP2017/072081, filed on Sep. 4, 2017.

(51) Int. Cl.
*F04C 15/00* (2006.01)
*F16J 7/00* (2006.01)
(Continued)

(52) U.S. Cl.
CPC .......... *F04C 15/0038* (2013.01); *F04C 18/16* (2013.01); *F04C 28/12* (2013.01);
(Continued)

(58) Field of Classification Search
CPC ...... F04C 15/0038; F04C 28/12; F04C 18/16; F04C 2240/56; F04C 2240/60; F16J 7/00
See application file for complete search history.

(56) References Cited

U.S. PATENT DOCUMENTS 3,593,959 A * 7/1971 Greene ............... F16K 31/1221
  251/63.6
5,921,166 A * 7/1999 Machida ............... F15B 15/08
  92/168

(Continued)

FOREIGN PATENT DOCUMENTS

WO WO 93/18307 9/1993
WO WO 2016/055412 4/2016

*Primary Examiner* — Dominick L Plakkoottam
*Assistant Examiner* — Paul W Thiede
(74) *Attorney, Agent, or Firm* — Reinhart Boerner Van Deuren P.C.

(57) ABSTRACT

A screw compressor comprises two screw rotors arranged in a screw rotor chamber, and mounted on the compressor housing to be rotatable about respective screw rotor axes, and mesh with one another. At least one control slide is arranged in a slide channel of the compressor housing, adjacently to both screw rotors by means of slide compression wall surfaces, is movable in a displacement direction parallel to the screw rotor axes, is rigidly connected to a piston rod that leads to a cylinder assembly for moving the at least one control slide, and is guided relative to the compressor housing by means of a guide insert that movably receives the piston rod in the displacement direction. The piston rod is guided transversely to the displacement direction in the guide insert in elastically resilient fashion by means of a guide element.

26 Claims, 9 Drawing Sheets

(51) Int. Cl.
 *F04C 28/12* (2006.01)
 *F04C 18/16* (2006.01)
(52) U.S. Cl.
 CPC .............. *F16J 7/00* (2013.01); *F04C 2240/56* (2013.01); *F04C 2240/60* (2013.01)

(56) References Cited

U.S. PATENT DOCUMENTS

| | | | | |
|---|---|---|---|---|
| 6,276,911 | B1* | 8/2001 | Krusche | F04C 28/125 |
| | | | | 418/201.2 |
| 6,302,668 | B1* | 10/2001 | Lee | F04C 18/16 |
| | | | | 418/201.2 |
| 7,887,310 | B2* | 2/2011 | Flanigan | F04C 28/125 |
| | | | | 418/201.2 |
| 2004/0234381 | A1 | 11/2004 | Hattori et al. | |
| 2017/0211574 | A1* | 7/2017 | Loerch | F04C 28/12 |

* cited by examiner

SCREW COMPRESSOR HAVING AT LEAST ONE CONTROL SLIDE INCLUDING PISTON ROD WITH GUIDE INSERTS

CROSS-REFERENCE TO RELATED PATENT APPLICATION

This application is a continuation of International application Number PCT/EP2017/072081 filed on Sep. 4, 2017.

This patent application claims the benefit of International application No. PCT/EP2017/072081 of Sep. 4, 2017, the teachings and disclosure of which are hereby incorporated in their entirety by reference thereto.

BACKGROUND OF THE INVENTION

The invention relates to a screw compressor comprising a compressor housing with a screw rotor chamber arranged therein, two screw rotors, which are arranged in the screw rotor chamber, are mounted on the compressor housing so as to be rotatable about respective screw rotor axes, mesh with one another by means of their screw contours, and each cooperate with compression wall surfaces arranged adjacently to and partially enclosing the screw contours in order to receive a gaseous medium fed by means of a low-pressure chamber arranged in the compressor housing and discharge said medium in the region of a high-pressure chamber arranged in the compressor housing, wherein the gaseous medium is enclosed, with an intake volume at low pressure, in compression chambers formed between the screw contours and compression wall surfaces adjacent to the screw contours and is compressed at high pressure to an end volume, the screw compressor also comprising at least one control slide, which is arranged in a slide channel of the compressor housing, adjacently to both screw rotors by means of slide compression wall surfaces, is movable in a displacement direction parallel to the screw rotor axes, is formed so as to influence the end volume and/or the starting volume, is rigidly connected to a piston rod that leads to a cylinder assembly for moving the at least one control slide, and is guided relative to the compressor housing by means of a guide insert that movably receives the piston rod in the displacement direction.

Screw compressors of this kind are known from the prior art, for example WO 2016/055412.

In screw compressors of this kind there is the problem that on the one hand precise guidance of the at least one control slide is necessary, firstly in the slide channel and secondly by the guide insert acting on the piston rod, and on the other hand, if the piston rod is guided very precisely in the guide insert, it may become jammed by tilting if the control slide moves transversely to the displacement direction in the slide channel on account of the play present.

The object of the invention is therefore to improve a screw compressor of the generic kind in such a way that the piston rod is guided in the guide insert as precisely as possible without becoming jammed.

SUMMARY OF THE INVENTION

This object is achieved in a screw compressor of the kind described at the outset in accordance with the invention in that the piston rod is guided transversely to the displacement direction in the guide insert in elastically resilient fashion by means of a guide element.

As a result of such an elastically resilient guidance of the piston rod, the piston rod may be prevented from becoming jammed in the guide insert.

The elastically resilient guidance of the piston rod by means of the guide element can be achieved particularly advantageously if the guide element is elastically movable relative to the carrier body of the guide insert transversely to the displacement direction.

On the other hand, however, in order to also achieve the most precise guidance possible of the piston rod in the guide insert, it is preferably provided that the guide element abuts against a peripheral surface of the piston rod in a manner elastically biased in the direction of the peripheral surface.

An elastically biased bearing of the guide element against the peripheral surface of this kind makes it possible to damp any vibrations occurring at the piston rod and, in addition, to achieve a greatest possible precision of the guidance of the piston rod in spite of the elastic resilience of the guidance of the piston rod.

It is particularly advantageous if the guide element is provided with at least one guide surface for the piston rod, which guide surface abuts against a peripheral surface of the piston rod, and if the guide surface is elastically movable relative to the carrier body of the guide insert transversely to the displacement direction.

No further details have yet been provided in respect of the construction of the guide element with the guide surface.

In accordance with a particularly favourable solution, the at least one guide element is formed by a guide region of a guide body, which guide region is movable relative to the carrier body of the guide insert.

The guide body could be movable relative to the guide insert in principle as a whole.

It is particularly favourable if the guide body is arranged sitting securely in the carrier body of the guide insert by means of a base.

In particular, in this case, the at least one guide element can be arranged such that it is guided by the guide body and is thus movable relative to the carrier body of the guide insert.

In principle, the arrangement of a guide element is sufficient in order to realise the solution according to the invention.

However, the piston rod can be guided particularly favourably if it is guided by a plurality of guide elements arranged at a spacing from one another in the displacement direction.

On the one hand, on account of the elastic movability of the piston rod, a multiple guidance of the piston rod of this kind by the guide elements is possible without the piston rod becoming jammed, and on the other hand such a guidance has the advantage that the damping effect on the piston rod with respect to vibrations occurring in the piston rod is thus increased.

In principle, the guide element could be formed from elastic material in such a way that, on account of its inherent deformation, it applies a bias to the peripheral surface of the piston rod when applied to the peripheral surface of the piston rod.

In order to achieve a defined bias of the guide element in the direction of the peripheral surface of the piston rod, it is preferably provided that the guide element is biased in the direction of the peripheral surface of the piston rod by a spring-elastic element acting on the guide element.

A spring-elastic element of this kind could act on the guide element in different directions.

It is particularly favourable if the spring-elastic element acts on the guide element on a side facing away from the piston rod.

In order to achieve the greatest possible biased force in the direction of the peripheral surface of the piston rod, it is preferably provided that the at least one guide element is supported by the spring-elastic element.

A support of the spring-elastic element can be achieved particularly favourably if the spring-elastic element is formed so as to support the guide element relative to the carrier body of the guide insert on a side facing away from the piston rod.

With regard to the arrangement of the spring-elastic element relative to the guide element, a wide range of different solutions are likewise conceivable.

The at least one guide element can be supported particularly advantageously if it is supported relative to the guide insert by two spring-elastic elements arranged at a spacing from one another in the displacement direction.

No further details have yet been provided in respect of the construction of the spring-elastic element.

The spring-elastic element could be assembled from a plurality of components acting on the guide element.

In accordance with a particularly advantageous solution, the spring-elastic element is formed in a manner surrounding the guide element.

In accordance with an embodiment of particularly simple construction, the spring-elastic element is formed as an annular body surrounding the guide element on a side facing away from the piston rod.

A spring-elastic annular body of this kind can be realised for example by forming the spring-elastic element as a spring annular body, wherein the spring element may be a helical spring formed into an annular body, or a spiral spring forming the annular body.

In accordance with another advantageous solution, the spring-elastic element is formed as an O-ring made of spring-elastic rubber material.

In order to achieve the most precise guidance possible for the piston rod in spite of the elastic resilience of the guide element, it is preferably provided that the movability of the piston rod transversely to the displacement direction is delimited by the guide insert, such that on the one hand a jamming of the piston rod in the guide insert may be prevented, but on the other hand the precision of the guidance of the piston rod can be maintained.

To this end, it is provided for example that the movability of the piston rod transversely to the displacement direction is delimited by a delimiting element.

This can be realised for example by arranging the delimiting element, which delimits the movement of the piston rod transversely to the displacement direction, on the guide body.

In other words, the guide body carries not only the guide element, but at the same time also the delimiting element.

For example, this can be realised by forming the delimiting element by a delimiting region of the guide body.

The delimiting region could be arranged such that it delimits the movement of the guide element.

However, in accordance with a solution of particularly simple construction, the delimiting element of the guide body is arranged in such a way that it acts directly on the piston rod in order to delimit the movement transversely to the displacement direction.

In accordance with another advantageous solution, the at least one elastically movable guide element is elastically movable relative to the carrier body of the guide insert to a limited extent.

In this case it is thus provided that the delimiting element acts on the guide element and delimits the movement of the guide element itself.

For example, it is provided in this case that the at least one guide element is elastically movable transversely to the displacement direction to a limited extent by a delimiting element arranged on the carrier body of the guide insert.

In the simplest case, this can be realised by providing the delimiting element with a delimiting surface which faces the guide element and is arranged on the carrier body of the guide insert.

The spatial arrangement of the spring-elastic element has not been described in greater detail in conjunction with the previous explanations of the solution according to the invention.

In accordance with a particularly advantageous solution, the spring-elastic element is arranged in the guide insert in a closed chamber.

An arrangement of this kind of the spring-elastic element in a closed chamber in the guide insert has the advantage that, even if the spring-elastic element should be partially destroyed, particles of said element may not pass into the screw compressor, in particular in the region of the control slide, since this is prevented by the closed chamber.

The spring-elastic element can be arranged particularly easily in a chamber if said element is arranged in a receiving groove provided in the guide body, wherein the receiving groove may be closed for example by a wall of the carrier body of the guide insert receiving the guide body.

In accordance with another advantageous solution, the spring-elastic element is arranged in a receiving groove provided in the carrier body of the guide insert, wherein the receiving groove is closed off for example by the guide element, such that a closed chamber for the spring-elastic element is likewise created.

In order to be able to operate the screw compressor according to the invention with a particularly low noise level, it is preferably provided that the elastic movability of the piston rod relative to the guide insert transversely to the displacement direction is smaller than the play of the control slide, guided in the slide channel, transversely to the displacement direction.

Further features and advantages of the invention are the subject of the following description and the drawings illustrating exemplary embodiments.

DETAILED DESCRIPTION OF THE INVENTION

Figure 1:
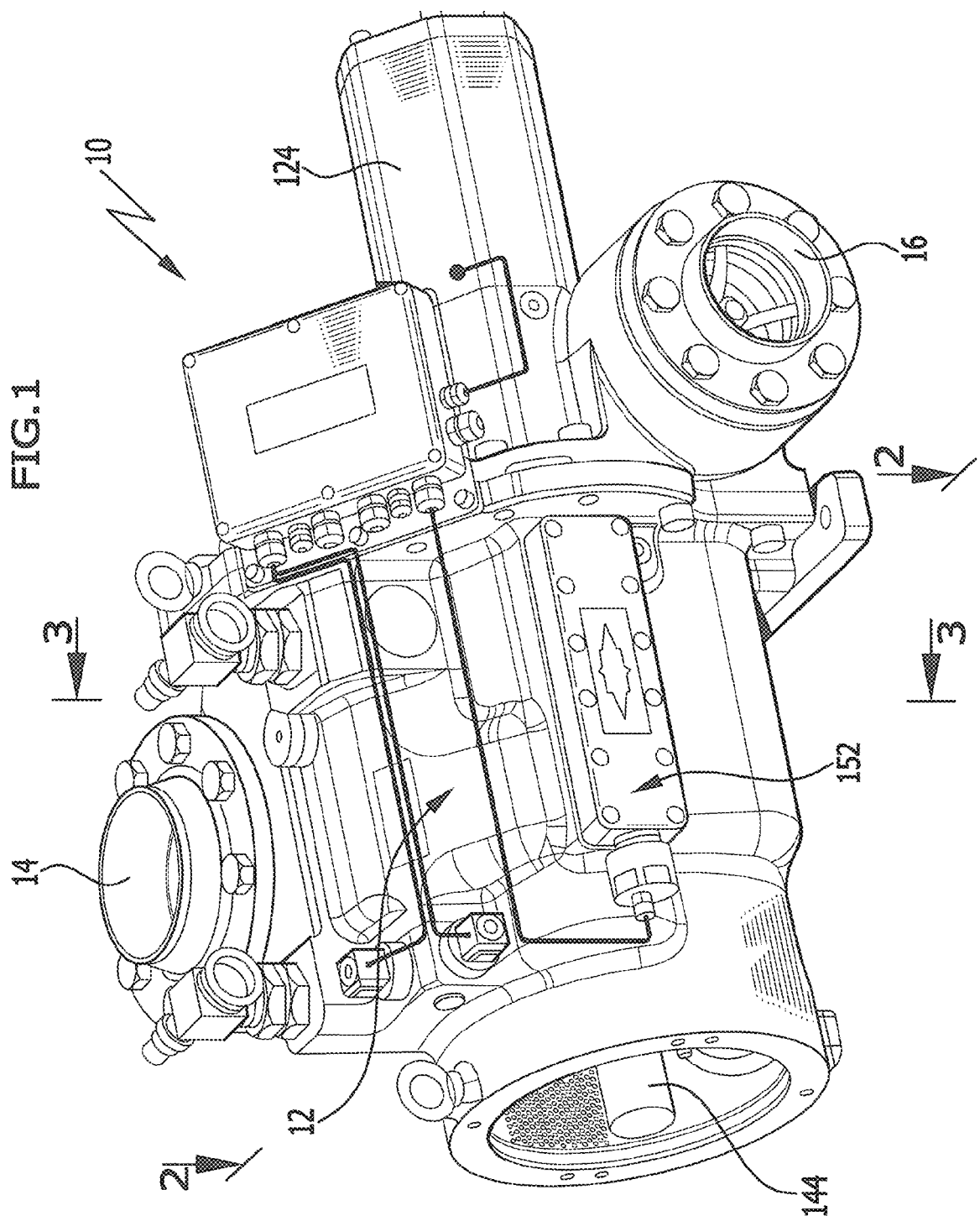
FIG. 1 shows a perspective view of a first exemplary embodiment of a screw compressor according to the invention.

An exemplary embodiment, shown in FIG. 1, of a screw compressor 10 according to the invention comprises a compressor housing denoted as a whole by 12, which compressor housing has an intake port 14, via which a gaseous medium that is to be drawn in, in particular refrigerant, is drawn in, and a pressure port 16, via which the gaseous medium compressed at high pressure, in particular the refrigerant, is discharged.

Figure 2:
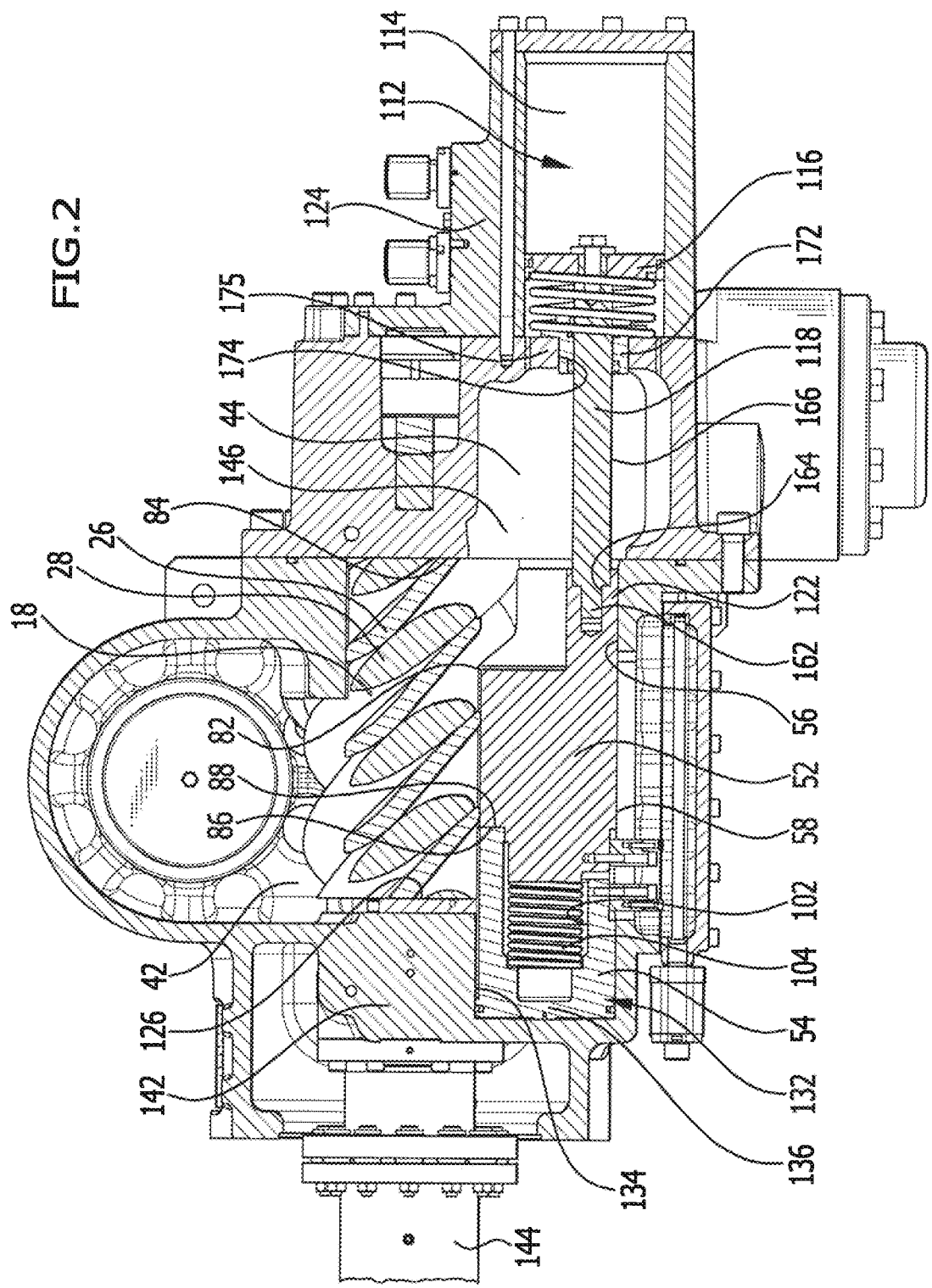
FIG. 2 shows a section along line 2-2 in FIG. 1 with maximum compressor power and smallest volume ratio.
Figure 3:
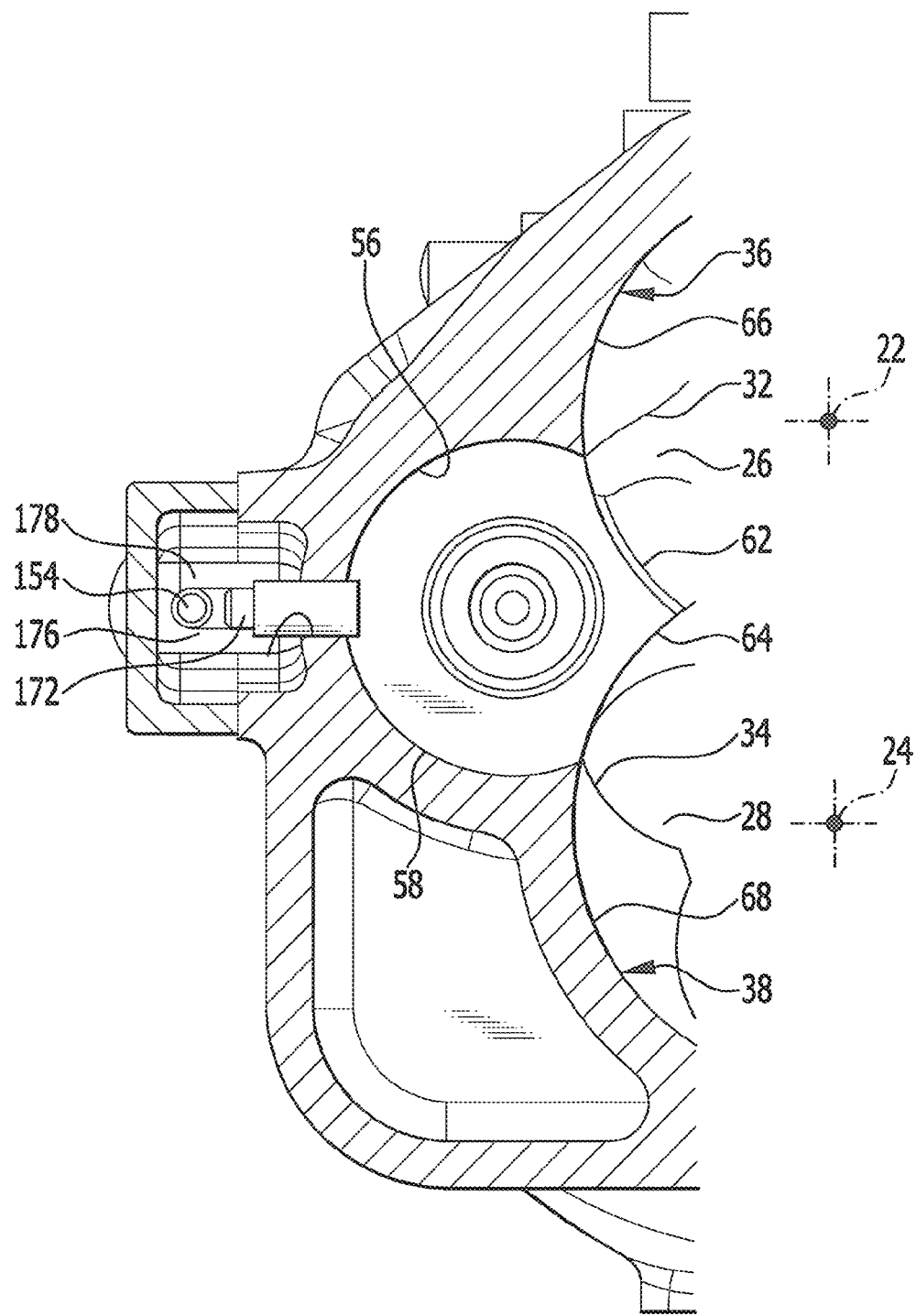
FIG. 3 shows a section along line 3-3 in FIG. 1 in the region of a position-detecting device.

As is shown in FIGS. 2 and 3, two screw rotors 26, 28, which are rotatable about respective screw rotor axes 22, 24, are provided in a screw rotor chamber 18 of the compressor housing 12, mesh with one another by means of their screw contours 32 and 34, and cooperate with respective compression wall surfaces 36 and 38, arranged adjacently to the periphery of the screw contours, of the screw rotor chamber 18 in order to receive a gaseous medium fed to a low-pressure chamber 42 arranged adjacently to the screw contours 32, 34 on the intake side, compress said gaseous medium, and discharge it at high pressure into a high-pressure chamber 44 in the compressor housing 12.

Here, the gaseous medium, in particular refrigerant, is enclosed at low pressure in an intake volume in compression chambers formed between the screw contours 32, 34 and the compression wall surfaces 36, 38 adjacently thereto, and is compressed to an end volume at high pressure.

In order to adapt the screw compressor 10, for example to the operating conditions required in a refrigerant circuit, the operating state of the screw compressor 10 is adapted on the one hand with regard to the volume ratio, specifying the relation between the maximum enclosed intake volume and the expelled end volume, and on the other hand with regard to the compressor rating, which specifies the proportion of the volume flow actually compressed by the screw compressor in relation to the maximum volume flow compressible by the screw compressor 10.

Figure 4:
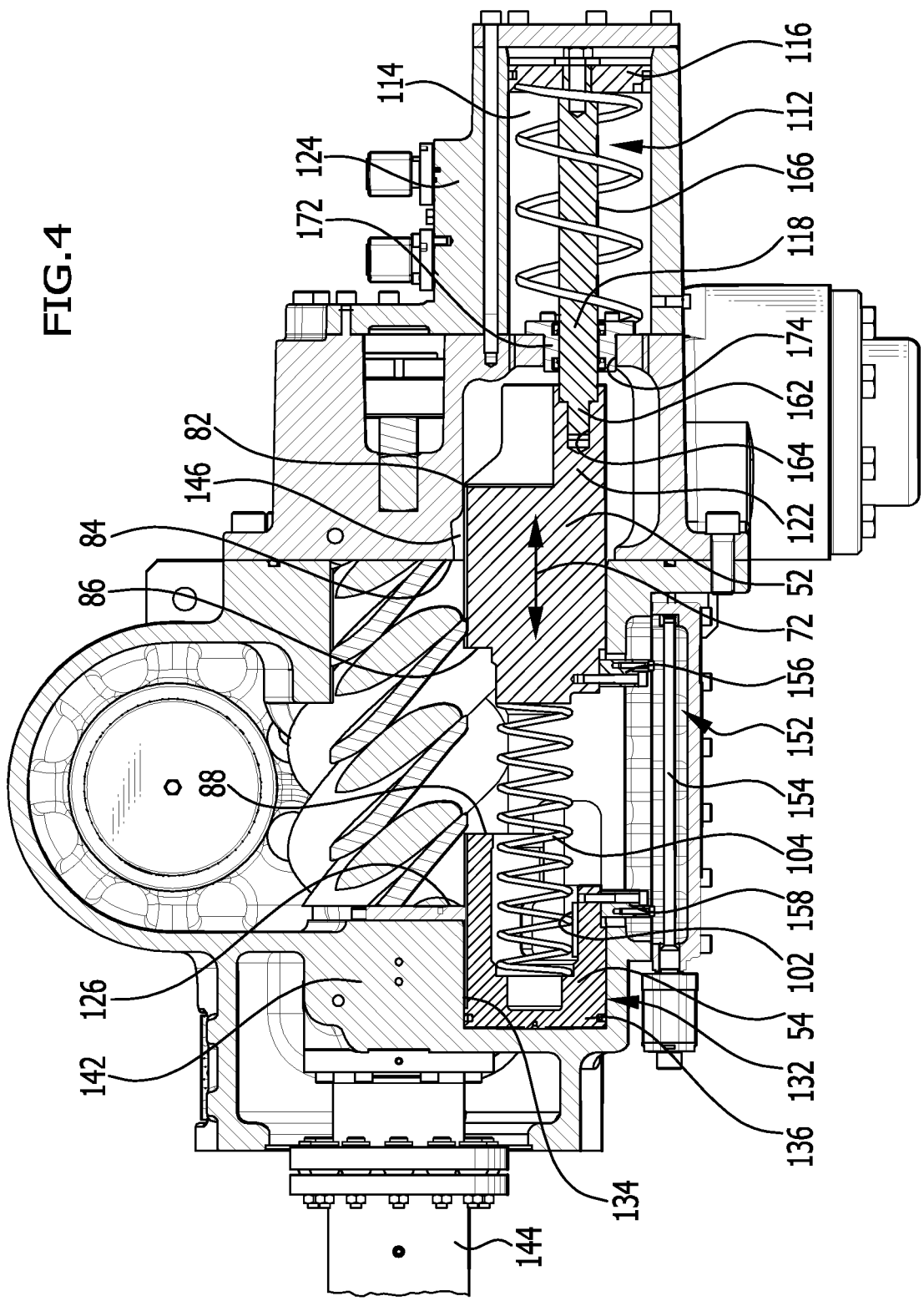
FIG. 4 shows a section similar to FIG. 2 under partial load.
Figure 5:
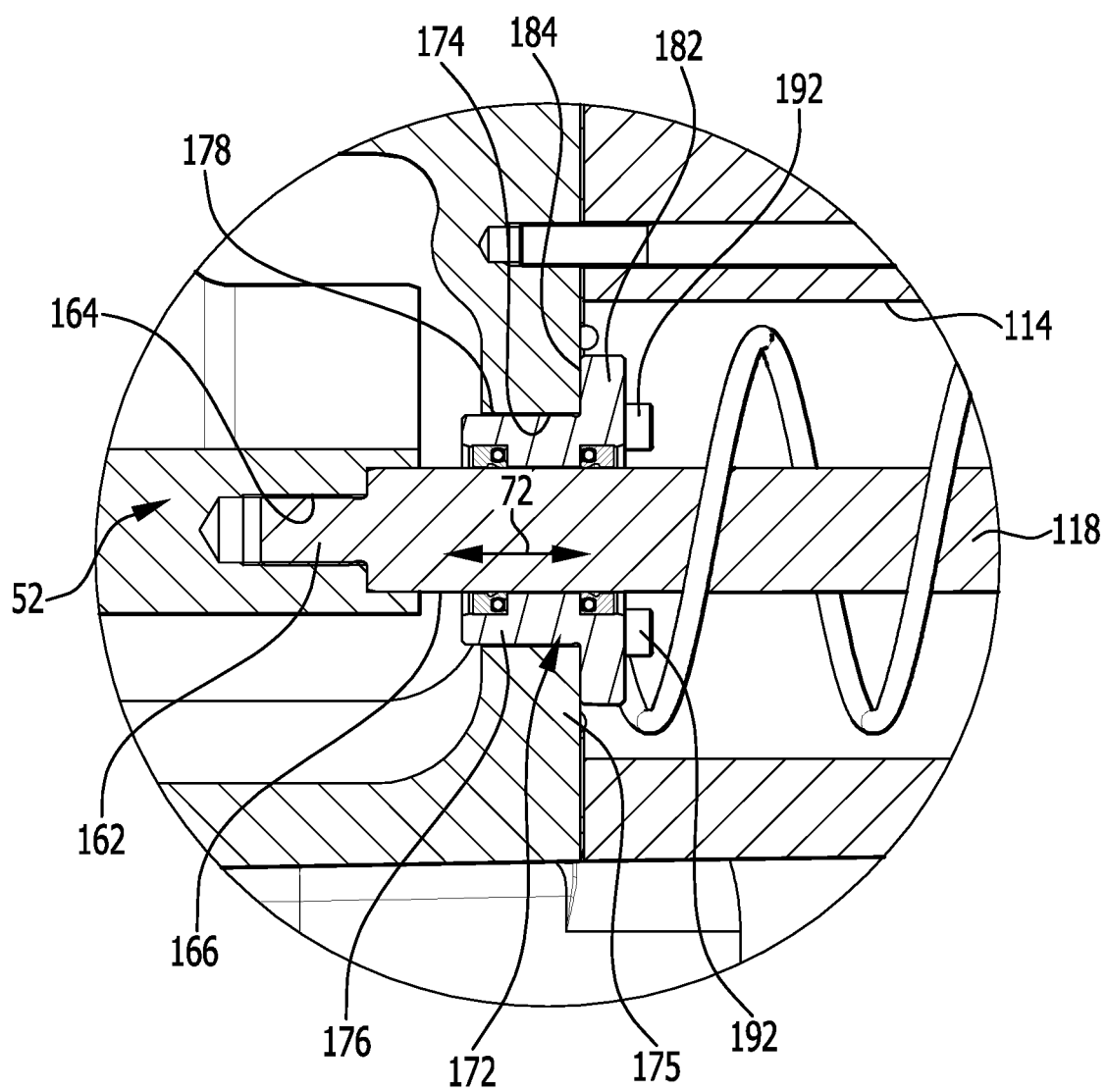
FIG. 5 shows an enlarged section similar to FIG. 2 through a first exemplary embodiment of a guide insert for a piston rod.

In order to adapt the operating state, in a first exemplary embodiment shown in FIGS. 2 to 4, a first control slide 52 and a second control slide 54 are arranged one after the other in a slide channel 56 provided in the compressor housing 12, wherein the slide channel 56 runs parallel to the screw rotor axes 22, 24 and guides the first control slide 52 and the second control slide 54 in the region of its peripheral guide surface 58 not adjacent to the screw rotors 26, 28.

The first control slide 52 faces the high-pressure chamber 44 and is therefore arranged on the high-pressure side, and the second control side 54 is arranged on the low-pressure side relative to the first control slide 52.

Each of the two control slides 52 and 54 also has a slide compression wall surface 62 adjacent to the screw rotor 26 and a slide compression wall surface 64 adjacent to the screw rotor 28, which constitute partial surfaces of the compression wall surfaces 36 and 38, and housing compression wall surfaces 66 and 68 formed by the compressor housing 12, which likewise constitute partial surfaces of the compression wall surfaces 36 and 38, supplement the compression wall surfaces 36 and 38, which together with the screw contours 32 and 34 contribute to the forming of the compression chambers (FIG. 2).

The first control slide 52 and the second control side 54 are formed, as shown in FIGS. 2 and 4, such that they are identical insofar as they form the slide compression wall surfaces 62 and 64 and the guide peripheral surface 58, and therefore they may be guided displaceably in the slide channel 56 of the compressor housing 12 in a displacement direction 72 running parallel to the screw rotor axes 22, 24.

The first control slide 52 forms an outlet edge 82, which faces the high-pressure chamber 44, defines the end volume of the compression chambers, is displaceable by sliding the first control slide 52 in the displacement direction 72, and, by means of its position relative to a high-pressure-side termination surface 84 of the screw rotor chamber 18, also determines the end volume of the formed compression chambers, and therefore the volume ratio.

This principle of the slide assembly is known and is described for example in WO 93/18307, to which reference is made with regard to the description of the operating principle.

As is shown in FIGS. 2 and 4, the first control slide 52 and the second control slide 54 have end faces 86 and 88 facing one another, by means of which end faces, as shown for example in FIG. 2, the control slides can be placed against one another, such that the slide compression wall surfaces 62 and 64 of the first control slide 52 and of the second control slide 54 transition into one another.

The first control slide 52 and the second control slide 54 are also displaceable relative to one another in the slide channel 56.

A compression spring 104 is preferably also provided in the interior 102 of the second control slide 54, and is used to act on the first control slide 52 relative to the second control slide 54 so that the end faces 86 and 88 are movable away from one another.

In order to displace the first control slide 52, as shown in FIGS. 2 and 4, a cylinder assembly 112 is provided and comprises a cylinder chamber 114 and a piston 116, wherein the piston 116 is connected to a piston rod 118, which produces a connection to the first control slide 52, more specifically for example to an extension 122 of the first control slide 52, which extension is arranged for example on a side opposite the end face 86.

The cylinder assembly 112 is also situated in particular on a side of the first control slide 52 opposite the second control slide 54, preferably in a high-pressure-side housing portion 124 of the compressor housing 12, which housing portion is arranged after the slide channel 56 and after the high-pressure chamber 44, and therefore on a side of the compressor housing 12 opposite the low-pressure chamber 42.

The second control slide 54 is displaceable by a cylinder assembly 132, which comprises a piston 136 movable in a cylinder chamber 134, wherein the cylinder chamber 134 extends in particular in the extension of the slide channel 56 in a low-pressure-side housing portion 142, in which there are arranged drive-side bearing units for the screw rotors 26 and 28, which for example are driveable by means of a drive shaft 144.

In particular, the piston 136 is integrally moulded on the second control slide 54 and has a piston surface, which corresponds at least to the cross-sectional area of the second control slide 54.

The low-pressure-side housing portion 142, which accommodates the cylinder chamber 134 of the cylinder assembly 132 for moving the second control slide 54, is situated in a region of the compressor housing 12 which is arranged opposite the high-pressure-side housing portion 124 for accommodating the cylinder chamber 114 or the cylinder assembly 112.

The first control slide 52 and the second control slide 54 can be slid together by the cylinder assemblies 112 and 132 so that the end faces 86 and 88 abut against one another in a compound position (FIG. 2), and the two control slides 52, 54 can also be moved jointly in the compound position, in the manner of a single control slide, which extends from the intake-side termination surface 126 in the direction of the pressure-side termination surface 84, and the outlet edge 82 of which helps to define the volume ratio, wherein, as shown in FIG. 2, the screw compressor 10 in this compound position continuously conveys the maximum volume flow.

The volume ratio can be adapted depending on the position of the outlet edge 82 relative to the termination surface 84: it increases with an increasingly shorter spacing between the outlet edge 82 and the termination surface 84, and reaches its maximum when the termination edge 82 has the shortest spacing from the termination surface 84, necessary for the minimisation of the end volume.

If the compressor performance, i.e. the volume flow actually conveyed, should now vary in addition, the end faces 86 and 88 are separated, as shown by way of example in FIG. 4, by moving the control slides 52 and 54 away from one another into a separated position. In the separated position the second control slide 54 is without effect, and in the separation position the position of the end face 86 of the first control slide 52 thus defines the starting volume.

Provided the outlet edge 82 is not in a position in which it defines the minimum possible end volume, however, the relation of the starting volume, defined by the end face 86, to the end volume, defined by the outlet edge 82, is not variable.

If, however, the first control slide 52 is sliding in direction of the high-pressure chamber 44 to such an extent that the outlet edge 82 has passed the termination surface 84, as shown in FIG. 4 and entered the receiving space 146, comprised by the high-pressure chamber 44, for the first control slide 52, it is possible to vary the starting volume defined by end face 86, without changing the end volume, since this then remains minimal at all times.

In order to eliminate the effect of the second control slide 54 in the separated position, said control slide is driven into the housing portion 142, in particular by means of the cylinder assembly 132, wherein the cylinder chamber 134 is dimensioned such that it simultaneously comprises a receiving space 148 for the second control slide 54 and thus creates the possibility of moving the second control slide 54 away from the first control slide 52 to such an extent that the end face 88 no longer influences the starting volume.

The second control slide 54 thus makes it possible to influence the starting volume since its either abuts with its end face 88 against the end face 86 of the first control slide 52 in order to form the compound position of the control slides 52, 54, and thus maximises the starting volume, or it may be moved with its own end face 88 away from the end face 86 of the first control slide 52 to such an extent that the starting volume is no longer influenced by the second control slide 54.

In order to detect the positions of the first control slide 52 and of the second control side 54, a position-detecting device denoted as a whole by 152 is provided, which comprises a detector element 154 extending parallel to the displacement direction 74 of the control slides 52, 54 and thus parallel to the screw rotor axes 22, 24, and is able to detect the positions of position indicator elements 156 and 158.

As shown in FIGS. 2 and 4, the first control slide 52 is preferably rigidly connected to the piston rod 118, which for example engages by means of a threaded pin 162 in a threaded bore 164 in the first control slide 52, such that the piston rod 118 is thus fixed rigidly relative to the first control slide 52.

In particular, the threaded bore 164 for the threaded pin 162 sits in the extension 122 of the first control slide 52.

The piston rod 118 is also provided with a peripheral surface 166, which runs parallel to the displacement direction 72 and is guided slidingly in a guide-insert receptacle 174, which is arranged in a wall 175 carrying the high-pressure-side housing portion 124 and is thus fixedly connected to the housing portion 124.

The guide insert 172 constitutes the only precise guidance of the piston rod 118 relative to the housing portions 142 and 124, and therefore a precise guidance of the first control slide 52 relative to the housing portions 142, 124, which is provided additionally to the guidance of the first control slide 52 in the slide channel 56.

On the whole, the first control slide 52 guided with play in the slide channel 56 is thus guided relative to the housing portions 142 and 124 and thus relative to the compressor housing 12 by the precise guidance of the piston rod 118 by means of the guide insert 172, such that any potential development of noise resulting from the play of the guidance of the first control slide 52 in the slide channel 56, in particular a rattling, may be avoided during operation of the screw compressor according to the invention, since the guidance of the piston rod 118 by means of the guide insert 172 permits a movement transversely to the displacement direction 72 that is smaller than the play of the first control slide 52 in the slide channel 56, and thus improves the guidance of the first control slide 52.

A first exemplary embodiment of the guide insert 172, as shown in FIGS. 5 to 9, comprises a carrier body 176, which on the one hand has a cylindrical lateral surface 178, by means of which the carrier body 176 sits in the guide-insert receptacle 174 and is positioned transversely to the displacement direction 72 by the guide-insert receptacle 174.

The carrier body 176 also comprises a flange body 182, which protrudes radially beyond the cylindrical lateral surface 178 and has a flange surface 184, which adjoins the cylindrical lateral surface 178 radially, can be placed against the wall 175 of the high-pressure-side housing portion 124 carrying the guide-insert receptacle 172, and for example is fixable to the wall 175 by means of screws 192 passing through boreholes 188 in the flange body 182, such that the carrier body 172 on the whole is fixedly connected to the wall 175.

The carrier body 176 is penetrated by an aperture 202, which has a cross-section larger than the piston rod 118, such that the piston rod 118 may be guided through said aperture 202 without touching an inner surface 206 thereof.

The inner surface 206 of the aperture 202 runs in particular cylindrically in relation to a centre axis 204 of the aperture 202 running parallel to the displacement direction 72, wherein the diameter of the aperture is larger than the diameter of the piston rod 118, such that the piston rod 118 may be guided through the apertures 202 without touching the cylindrical inner surface 206.

The carrier body 176 is provided with step-like annular grooves 212 and 214 on both sides of the aperture 202, which annular grooves on the one hand have a groove base surface 216 and 218 running cylindrically in relation to the centre axis 204 and are delimited by side surfaces 222, 224 on sides towards one another, whereas the annular grooves 212, 214 do not have any side surfaces on their sides remote from one another, and are therefore open, however shoulders 226, 228 are provided on these sides.

Figure 6:
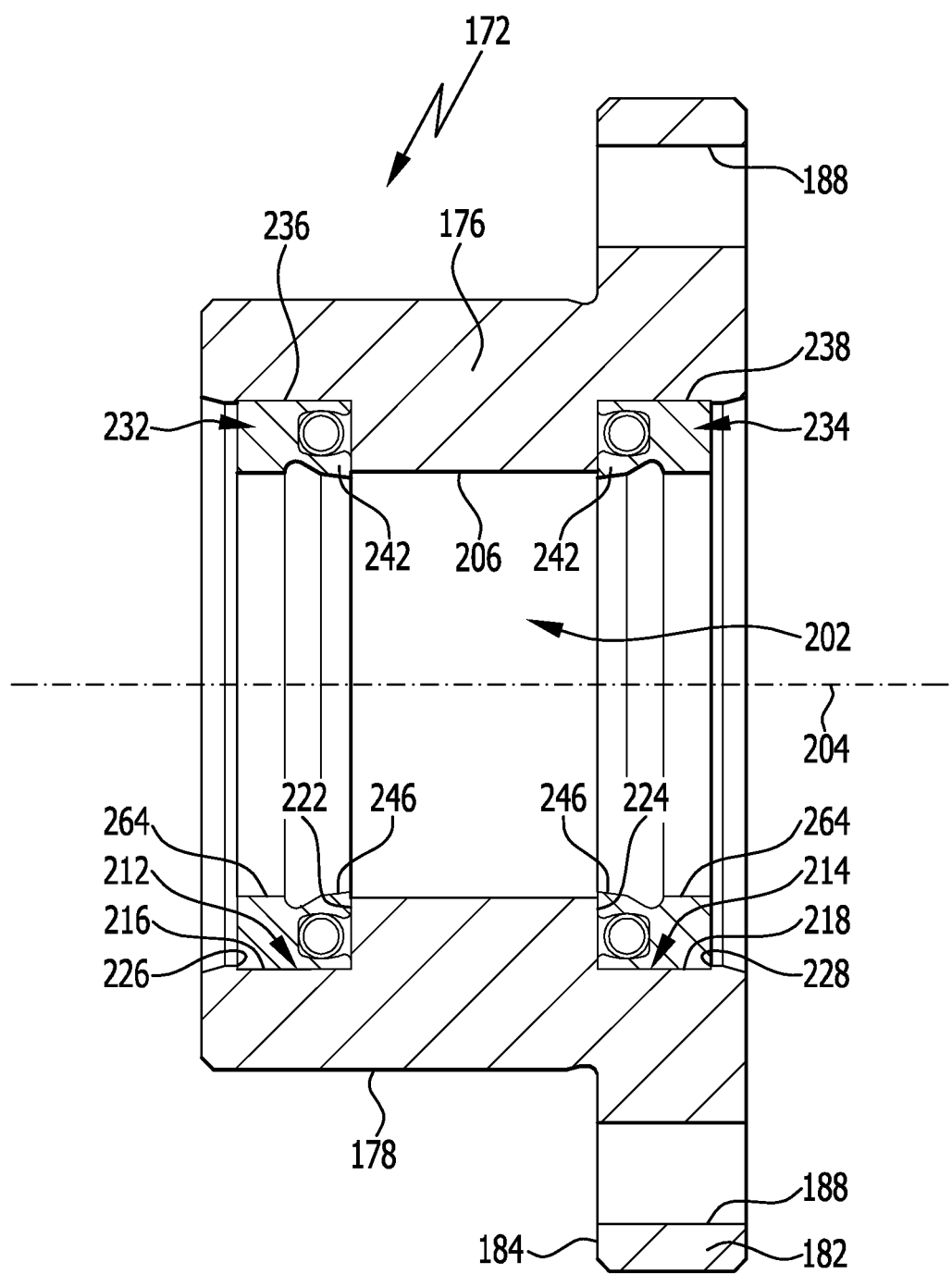
FIG. 6 shows a section similar to FIG. 5 through the guide insert on a more enlarged scale.

As shown in FIG. 6, guide bodies 232, 234 sit in the annular grooves 212, 214 and abut by means of their cylindrical outer surfaces 236, 238 against the groove-base surfaces 216, 218 and are thus arranged in the carrier body 176 in a manner centred in a direction transverse to the centre axis 204, and in addition are fixed by the side surfaces 222 and 224 and the shoulders 226 and 228 against movements in the direction of the centre axis 204.

Figure 7:
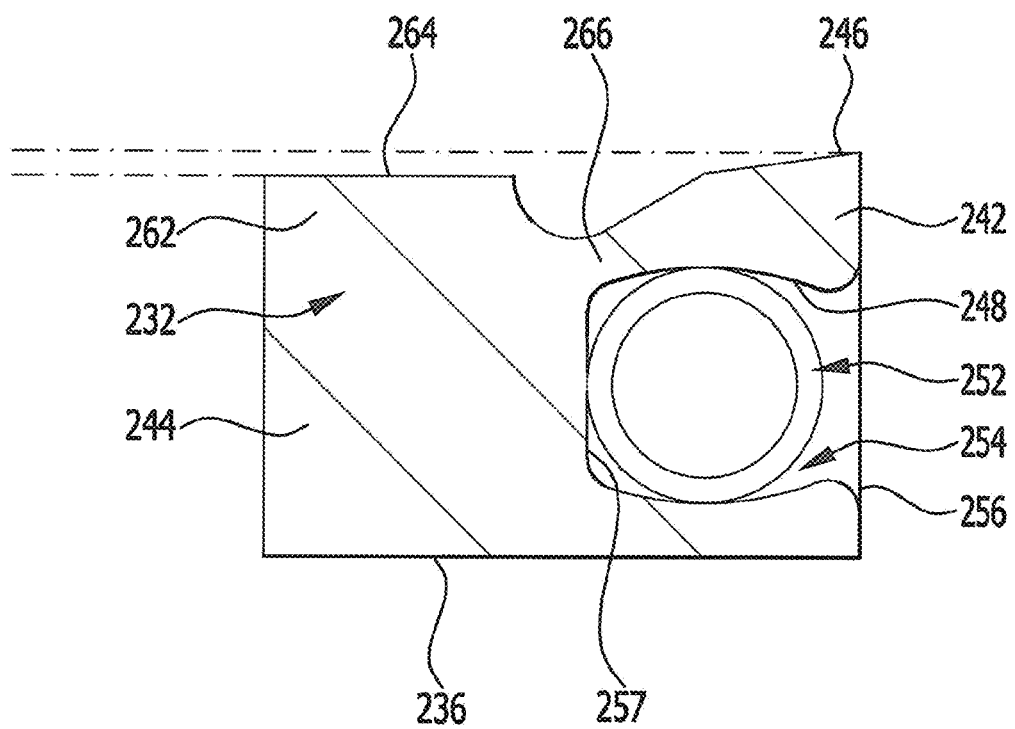
FIG. 7 shows a partial section through a guide body of the first exemplary embodiment.

Each of the guide bodies 232, 234, as shown by way of example on the guide body 232 in FIG. 7, has a radially inner guide element 242 facing the centre axis 204, which guide element is formed for example in the form of a lip running annularly about the centre axis 204, starting from a base 244 of the guide body 232, and forms a guide surface 246, which abuts without play against the peripheral surface 166 of the piston rod 118 in the installed state, but may move elastically relative to the base 244 transversely to the displacement direction 72, and thus also radially in relation to the centre axis 204.

In order to bias the guide element 242, a peripheral surface 248 of said guide element, opposite the guide surface 246, is acted on by a spring-elastic element 252, which for example is formed as an annular spring, which is arranged in the particular guide body 232 in a receiving groove 254 running annularly about the centre axis 204 and extending in a direction parallel to the centre axis 204, wherein a side wall of the receiving groove 244 is delimited by the peripheral surface 248 of the guide element 242, and wherein the receiving groove 254 preferably extends from an annular groove opening 256 facing the respective side surface 222 or 224 of the respective annular groove 212,214, into the guide body 232 or 234 in a direction of extent into the guide body 232 or 234 parallel to the centre axis 204, as far as a groove base 257, such that the lateral wall of the receiving groove 254 forming the peripheral surface 248 of the guide element 242 runs approximately parallel to the displacement direction 72, wherein an approximately parallel course shall be understood to mean a course with an angular deviation of up to ±20°.

The guide body 232 additionally comprises a delimiting element 262 carried by the base body 244, which delimiting element carries a delimiting surface 264, which is set back in relation to the guide surface 246.

The delimiting surface 264 is arranged non-elastically relative to the outer surface 236 by the delimiting element 262 and the base 244 of the guide body 232 and is used to define a maximum movement of the piston rod 118 transversely to the displacement direction 72 radially in relation to the centre axis 204 under elastic deformation of the guide element 242.

The guide element 242 is preferably integrally moulded on the base 244, and the delimiting element 262 is also integrally moulded on the base 244 of the particular guide body 232.

The guide body 232 or 234 can be produced preferably from a plastics material in particular comprising carbon fractions, for example PTFE or fluorocarbon compounds, which, in the case of the base 244 and the delimiting element 262 carried by the base 244, is substantially non-elastic radially in relation to the centre axis, but allows an elastic movability of the guide element 242 relative to the base 244 on account of a wall portion 266 that is thinned between the base 244 and the guide element 242.

A plastics material of this kind comprising carbon fractions can be suitably configured in particular in respect of the degree of hardness, the anti-friction properties, and the wear resistance.

Figure 8:
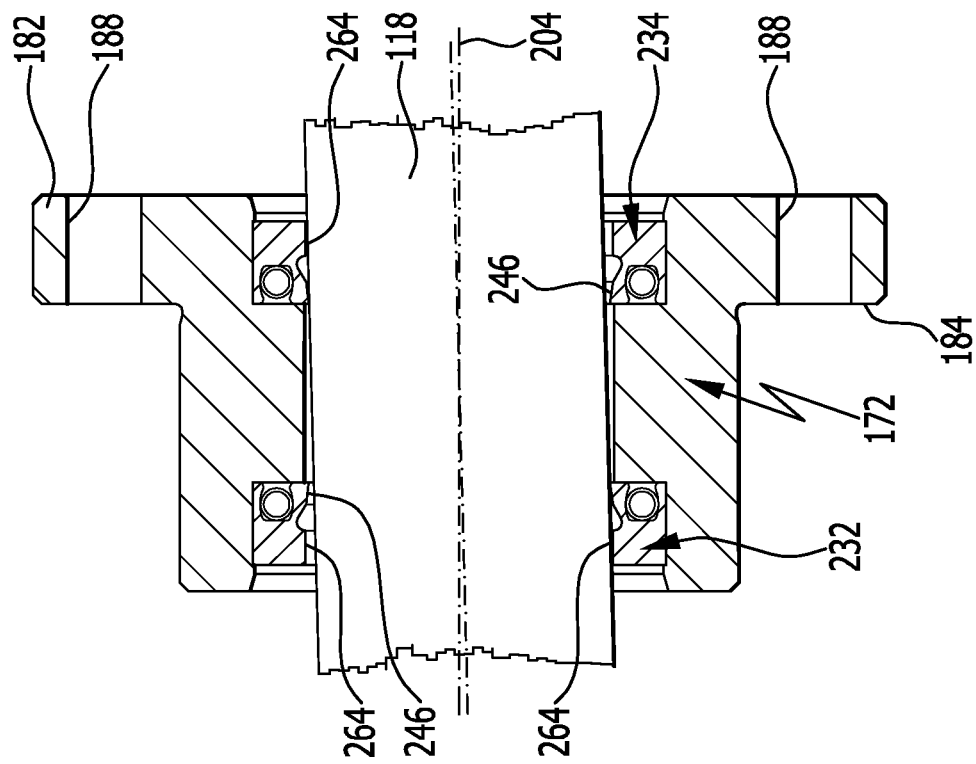
FIG. 8 shows a section similar to FIG. 5 with the piston rod parallel to the centre axis of the guide insert.
Figure 9:
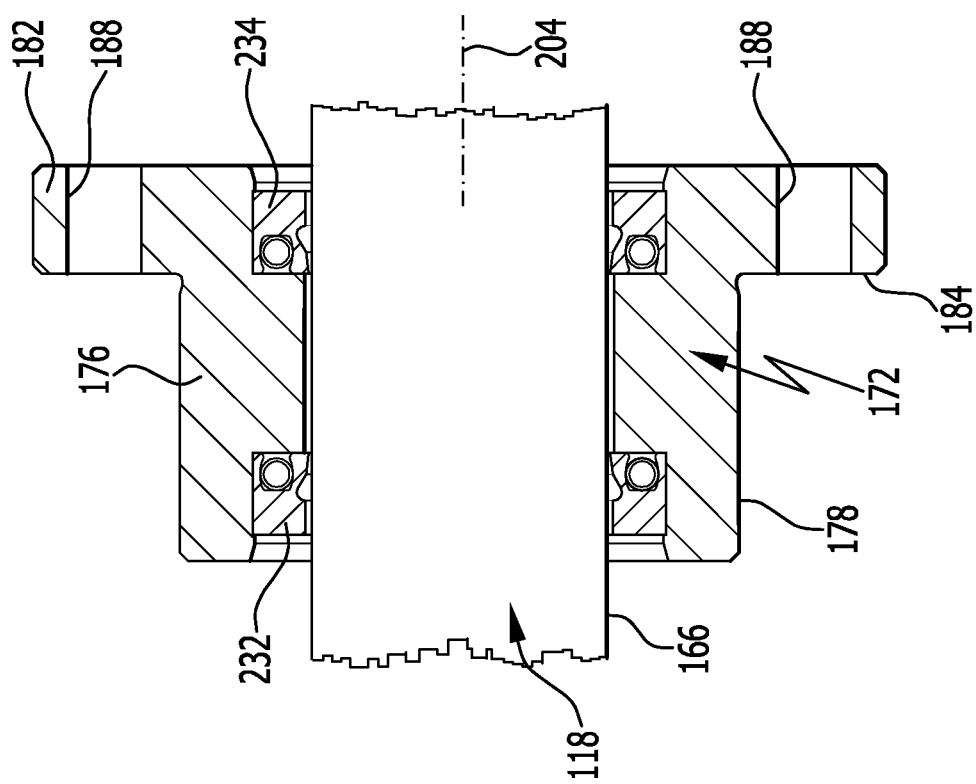
FIG. 9 shows an illustration similar to FIG. 8 with the piston rod tilted relative to the centre axis.

Due to the spring-elastic element 252 acting on the guide element 242 in a direction that is radial in relation to the centre axis 204, the guide surface 246, as is shown for example in FIG. 8, abuts without gaps against the peripheral surface 166 of the piston rod 118 and causes the piston rod 118 to be precisely guided relative to the guide insert 172, which is in turn fixedly connected to the wall 175, such that the piston rod 118 is precisely guided by the guide bodies 232, 234 arranged at a spacing from one another in the displacement direction 72 and comprising the guide elements 242, as is likewise shown in FIG. 8.

However, the guide elements 242 have the possibility of deflecting radially in relation to the centre axis 204, in order to permit a minor tilting of the piston rod 118 in relation to the centre axis 204, for example caused by the play of the first control slide 52 in the slide channel 56, wherein the movement of the piston rod 118 in the sense of a tilting relative to the centre axis 204 is delimited by the delimiting surfaces 264 of the delimiting elements 262 of the guide body 232 or 234, such that the limited extent of the tilting of the piston rod 118 relative to the centre axis 204, due to the radial position of the delimiting surfaces 264 relative to the centre axis 204 with the appropriate spacing between the delimiting surfaces 264 in the displacement direction 72, may be defined by the radial position of the delimiting surfaces 264 relative to the centre axis 204.

The elasticity of the guide elements 242 in the radial direction in relation to the centre axis 204 is not compromised in this case, however the possible movement of said guide elements in the radial direction in relation to the centre axis 204 is delimited by the delimiting surfaces 264.

On the one hand, by means of the elastically movable guide elements 242 biased radially in the direction of the centre axis 204 by the spring-elastic elements 252, it is possible for the piston rod 118 to be guided relative to the guide insert 172 without gaps, which damps vibrations of the piston rod 118, and at the same time a canting of the piston rod 118 in the guide insert 172 is prevented by the elastic deflection of the guide elements 242 in the event of any minor tilting of the piston rod 118 relative to the centre axis 204, wherein in addition the maximum possible tilting of the piston rod is delimited by the delimiting surfaces 264 of the delimiting elements 262, such that the elastic deflection of the guide element 242 in the radial direction in relation to the centre axis 204 is possible only to a limited extent, in order to maintain the required precision of the guidance of the piston rod 118.

Since the spring-elastic element 252 is arranged in the receiving groove 254 in the carrier body 176, with the receiving groove running annularly around the centre axis, and since the receiving groove 254 has an annular groove opening 256 facing the side surface 222 or 224 of the relevant annular groove 212, 214, in the case of guide bodies 232, 234 inserted into the carrier body 176b of the guide insert 172 the particular groove opening 265 is closed by the corresponding side surface 222 or 224 of the annular groove 212, 214, such that the elastic element 252 is thus arranged encapsulated in the guide insert 172 and is thus protected against the effects of dirt and fluids, and in addition the screw compressor is also protected against a break in the spring-elastic element 252, since particles created if the spring-elastic element 152 breaks cannot leave the guide insert 172.

Figure 10:
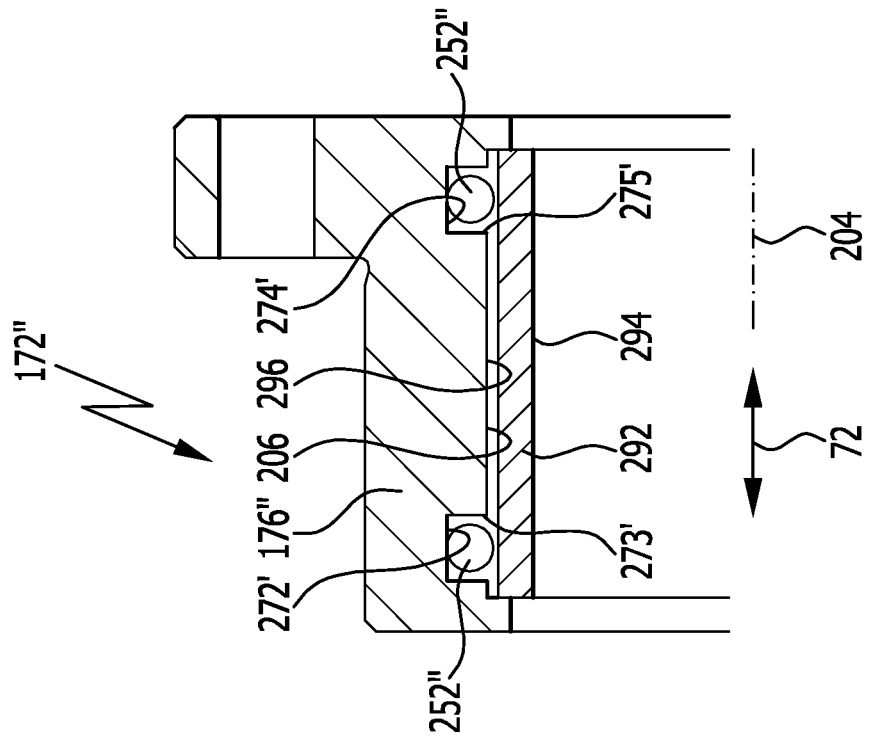
FIG. 10 shows a partial section similar to FIG. 6 through a second exemplary embodiment of a guide insert.

In a second exemplary embodiment of a guide insert 172' according to the invention shown in FIG. 10, the carrier body 176' is provided with receiving grooves 272, 274, which extend into the carrier body radially in relation to the centre axis 204 starting from the inner surface 206, are arranged at a spacing from one another in the displacement direction, and in which there are arranged spring-elastic elements 252, which for example are formed in this case as O-rings made of a rubber-elastic material.

The receiving grooves 272, 274 are therefore provided, respectively, with a groove opening 273 and 275 facing the centre axis 204, and annular guide elements 276, 278 are inserted into these groove openings 273, 275, which annular guide elements on the one hand close the groove openings 273, 275 and on the other hand have guide surfaces 282, 284 facing the centre axis 204.

The guide elements 276, 278 are, for their part, produced from an elastic material and are thus acted on by the spring-elastic elements 252 radially in relation to the centre axis 204 in the direction of the centre axis 204, such that they are placed by means of their guide surfaces 282, 284 against the peripheral surface 166 of the piston rod 118, likewise without gaps.

The guide elements 276, 278 are supported relative to the carrier body 176' by the spring-elastic elements 252 on the carrier body 176', these being arranged in the receiving grooves 272, 274, and are thus able to move radially in relation to the central axis 204, in order to prevent a canting of the piston rod 118 in the event of a tilting of the piston rod 118 relative to the centre axis 204.

The tilting of the piston rod 118 relative to the centre axis 204 is delimited in this case by the inner surface 206 of the aperture 202 representing a delimiting surface 286, such that, in the same way as that described in conjunction with the first exemplary embodiment, the elastic deflection of the guide elements 276, 278 for preventing a canting of the piston rod 118 does not compromise the precision as a whole of the guidance of the piston rod 118 for guiding the first control slide 52 in the slide channel 56.

Otherwise, those elements of the second exemplary embodiment that are identical to those in the first exemplary embodiment described above are provided with the same reference numerals, and therefore, for a description of said elements, reference can be made fully to the comments provided in relation to the first exemplary embodiment.

Figure 11:
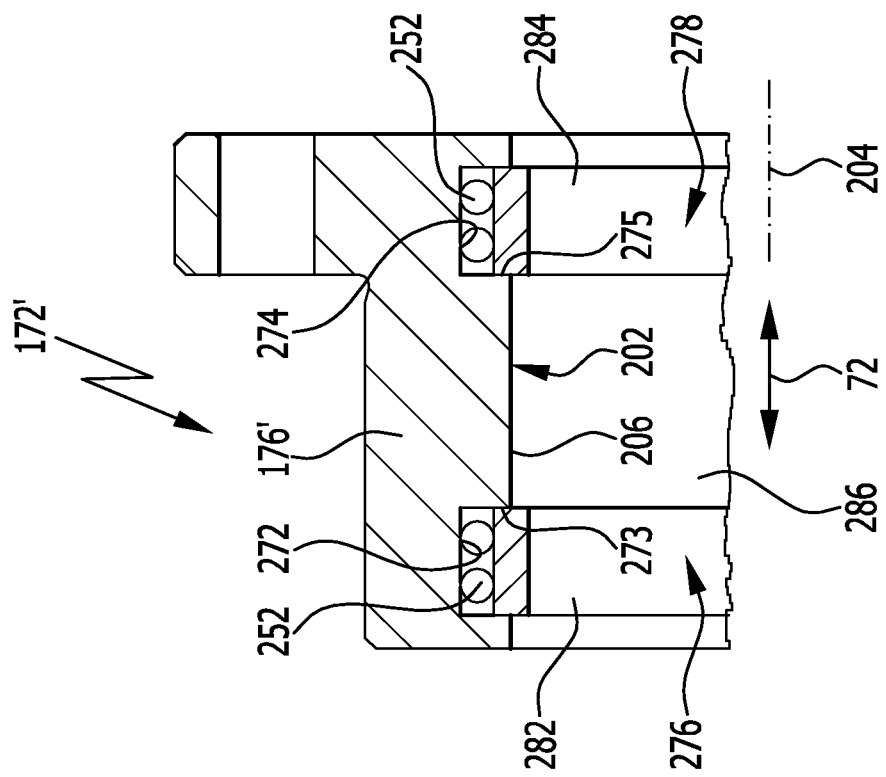
FIG. 11 shows a partial section similar to FIG. 6 through a third exemplary embodiment of a guide insert.

In a third exemplary embodiment, shown in FIG. 11, the carrier body 176" of the guide insert 172" is likewise provided with receiving grooves 272', 274' extending radially away from the centre axis 204 and into the carrier body 176", wherein groove openings 273', 275' of the annular grooves 212", 214" arranged at a spacing from one another in the displacement direction 72 are closed by a guide element 292, which extends not only over the groove openings 272" and 274", but also from one groove opening 272" to the other groove opening 274" and forms a guide surface 294 that is continuous on the whole.

Similarly to the first and second exemplary embodiment, elastic elements 252" sit in the receiving grooves 272', 274' and act on the guide element 292, likewise radially in relation to the centre axis 204, in the direction of the centre axis 204 and cause the guide element 292 to abut, without gaps, by means of its guide surface 294 against the peripheral surface 166 of the piston rod 118, at least in the regions in which the elastic elements 252" are effective.

In this exemplary embodiment as well, the guide element 292 is preferably formed from an elastic material and can therefore deform in the radial direction due to the pressure applied by means of the elastic elements 252", such that the guide element 292 can be applied, likewise by means of the guide surface 294 and without gaps, against the peripheral surface 166 of the piston rod 118.

In the third exemplary embodiment the movement of the guide element 292 transversely to the displacement direction 72 is delimited in that the inner surface 206 situated between the receiving grooves 272', 274' forms a delimiting surface 296 for the movement of the guide element 292 transversely to the displacement direction 72, and thus, in contrast to the previous exemplary embodiments, does not act on the peripheral surface 166 of the piston rod 118 directly, but by means of the guide element 292.

In this case as well, the elastic elements 252" are arranged encapsulated in the annular grooves 212" and 214", on the one hand in order to be protected against the effect of dirt and fluids, but on the other hand also in order to protect the screw compressor against particles that might be created in the event that the elastic elements 252" should break or are partially destroyed.

Otherwise, those elements of the third exemplary embodiment that are identical to those in the previous exemplary embodiments are provided with the same reference numerals, and therefore, for a description of said elements, reference can be made fully to the comments provided in relation to the first exemplary embodiment.

The invention claimed is:

1. A screw compressor comprising:
   a compressor housing with a screw rotor chamber arranged therein,
   two screw rotors, which are arranged in the screw rotor chamber, are mounted on the compressor housing so as to be rotatable about respective screw rotor axes, mesh with one another by means of their screw contours, and each cooperate with compression wall surfaces arranged adjacently to and partially enclosing the screw contours in order to receive a gaseous medium fed by means of a low-pressure chamber arranged in the compressor housing and discharge said medium in the region of a high-pressure chamber arranged in the compressor housing, wherein the gaseous medium is enclosed in compression chambers formed between the screw contours and the compression wall surfaces adjacent to the screw contours and is compressed from a starting volume at low pressure to high pressure at an end volume,
   at least one control slide, which is arranged in a slide channel of the compressor housing, adjacently to both screw rotors by means of slide compression wall surfaces, is movable in a displacement direction parallel to the screw rotor axes to influence the end volume and/or the starting volume, is connected to a piston rod that leads to a cylinder assembly for moving the at least one control slide, and is guided relative to the compressor housing by means of a guide insert that movably receives the piston rod in the displacement direction,
   wherein the piston rod is guided transversely to the displacement direction in the guide insert in elastically resilient fashion by means of a guide element, and
   wherein the guide element abuts against a peripheral surface of the piston rod in an elastically biased manner in the direction of the peripheral surface.

2. A screw compressor in accordance with claim 1, wherein the guide element is elastically movable relative to a carrier body of the guide insert transversely to the displacement direction.

3. A screw compressor in accordance with claim 1, wherein the guide element is formed by a guide region of a guide body, wherein the guide region is movable relative to a carrier body of the guide insert.

4. A screw compressor in accordance with claim 3, wherein the guide body is seated in the carrier body of the guide insert by means of a base.

5. A screw compressor in accordance with claim 4, wherein the at least one guide element is guided by the guide body and is movable relative to the carrier body of the guide insert.

6. A screw compressor in accordance with claim 1, wherein the piston rod is guided by a plurality of guide elements arranged at a spacing from one another in the displacement direction.

7. A screw compressor comprising:
- a compressor housing with a screw rotor chamber arranged therein,
- two screw rotors, which are arranged in the screw rotor chamber, are mounted on the compressor housing so as to be rotatable about respective screw rotor axes, mesh with one another by means of their screw contours, and each cooperate with compression wall surfaces arranged adjacently to and partially enclosing the screw contours in order to receive a gaseous medium fed by means of a low-pressure chamber arranged in the compressor housing and discharge said medium in the region of a high-pressure chamber arranged in the compressor housing, wherein the gaseous medium is enclosed in compression chambers formed between the screw contours and the compression wall surfaces adjacent to the screw contours and is compressed from a starting volume at low pressure to high pressure at an end volume,
- at least one control slide, which is arranged in a slide channel of the compressor housing, adjacently to both screw rotors by means of slide compression wall surfaces, is movable in a displacement direction parallel to the screw rotor axes to influence the end volume and/or the starting volume, is connected to a piston rod that leads to a cylinder assembly for moving the at least one control slide, and is guided relative to the compressor housing by means of a guide insert that movably receives the piston rod in the displacement direction,
- wherein the piston rod is guided transversely to the displacement direction in the guide insert in elastically resilient fashion by means of a guide element, and
- wherein the guide element is provided with at least one guide surface for the piston rod, the at least one guide surface abuts against a peripheral surface of the piston rod without gaps between the peripheral surface and the piston rod, and in that the guide surface is elastically movable relative to a carrier body of the guide insert transversely to the displacement direction.

8. A screw compressor comprising:
- a compressor housing with a screw rotor chamber arranged therein,
- two screw rotors, which are arranged in the screw rotor chamber, are mounted on the compressor housing so as to be rotatable about respective screw rotor axes, mesh with one another by means of their screw contours, and each cooperate with compression wall surfaces arranged adjacently to and partially enclosing the screw contours in order to receive a gaseous medium fed by means of a low-pressure chamber arranged in the compressor housing and discharge said medium in the region of a high-pressure chamber arranged in the compressor housing, wherein the gaseous medium is enclosed in compression chambers formed between the screw contours and the compression wall surfaces adjacent to the screw contours and is compressed from a starting volume at low pressure to high pressure at an end volume,
- at least one control slide, which is arranged in a slide channel of the compressor housing, adjacently to both screw rotors by means of slide compression wall surfaces, is movable in a displacement direction parallel to the screw rotor axes to influence the end volume and/or the starting volume, is connected to a piston rod that leads to a cylinder assembly for moving the at least one control slide, and is guided relative to the compressor housing by means of a guide insert that movably receives the piston rod in the displacement direction,
- wherein the piston rod is guided transversely to the displacement direction in the guide insert in elastically resilient fashion by means of a guide element, and
- wherein a guide element is biased in the direction of a peripheral surface of the piston rod by a spring-elastic element acting on the guide element.

9. A screw compressor in accordance with claim 8, wherein the guide element is supported by the spring-elastic element.

10. A screw compressor in accordance with claim 8, wherein the guide element is supported relative to the guide insert by two spring-elastic elements arranged at a spacing from one another in the displacement direction.

11. A screw compressor in accordance with claim 8, wherein the spring-elastic element is formed as an annular body surrounding the guide element on a side facing away from the piston rod.

12. A screw compressor in accordance with claim 8, wherein the spring-elastic element is formed as a spring annular body.

13. A screw compressor in accordance with claim 8, wherein the spring-elastic element is formed as an O-ring.

14. A screw compressor comprising:
- a compressor housing with a screw rotor chamber arranged therein,
- two screw rotors, which are arranged in the screw rotor chamber, are mounted on the compressor housing so as to be rotatable about respective screw rotor axes, mesh with one another by means of their screw contours, and each cooperate with compression wall surfaces arranged adjacently to and partially enclosing the screw contours in order to receive a gaseous medium fed by means of a low-pressure chamber arranged in the compressor housing and discharge said medium in the region of a high-pressure chamber arranged in the compressor housing, wherein the gaseous medium is enclosed in compression chambers formed between the screw contours and the compression wall surfaces adjacent to the screw contours and is compressed from a starting volume at low pressure to high pressure at an end volume,
- at least one control slide, which is arranged in a slide channel of the compressor housing, adjacently to both screw rotors by means of slide compression wall surfaces, is movable in a displacement direction parallel to the screw rotor axes to influence the end volume and/or the starting volume, is connected to a piston rod that leads to a cylinder assembly for moving the at least one control slide, and is guided relative to the compressor housing by means of a guide insert that movably receives the piston rod in the displacement direction, wherein the piston rod is guided transversely to the displacement direction in the guide insert in elastically resilient fashion by means of a guide element, and wherein a spring-elastic element acts on the guide element on a side facing away from the piston rod.

15. A screw compressor comprising:

a compressor housing with a screw rotor chamber arranged therein, two screw rotors, which are arranged in the screw rotor chamber, are mounted on the compressor housing so as to be rotatable about respective screw rotor axes, mesh with one another by means of their screw contours, and each cooperate with compression wall surfaces arranged adjacently to and partially enclosing the screw contours in order to receive a gaseous medium fed by means of a low-pressure chamber arranged in the compressor housing and discharge said medium in the region of a high-pressure chamber arranged in the compressor housing, wherein the gaseous medium is enclosed in compression chambers formed between the screw contours and the compression wall surfaces adjacent to the screw contours and is compressed from a starting volume at low pressure to high pressure at an end volume, at least one control slide, which is arranged in a slide channel of the compressor housing, adjacently to both screw rotors by means of slide compression wall surfaces, is movable in a displacement direction parallel to the screw rotor axes to influence the end volume and/or the starting volume, is connected to a piston rod that leads to a cylinder assembly for moving the at least one control slide, and is guided relative to the compressor housing by means of a guide insert that movably receives the piston rod in the displacement direction, wherein the piston rod is guided transversely to the displacement direction in the guide insert in elastically resilient fashion by means of a guide element, and wherein a spring-elastic element is formed so as to support the guide element relative to the carrier body of the guide insert on a side facing away from the piston rod.

16. A screw compressor comprising:

a compressor housing with a screw rotor chamber arranged therein, two screw rotors, which are arranged in the screw rotor chamber, are mounted on the compressor housing so as to be rotatable about respective screw rotor axes, mesh with one another by means of their screw contours, and each cooperate with compression wall surfaces arranged adjacently to and partially enclosing the screw contours in order to receive a gaseous medium fed by means of a low-pressure chamber arranged in the compressor housing and discharge said medium in the region of a high-pressure chamber arranged in the compressor housing, wherein the gaseous medium is enclosed in compression chambers formed between the screw contours and the compression wall surfaces adjacent to the screw contours and is compressed from a starting volume at low pressure to high pressure at an end volume, at least one control slide, which is arranged in a slide channel of the compressor housing, adjacently to both screw rotors by means of slide compression wall surfaces, is movable in a displacement direction parallel to the screw rotor axes to influence the end volume and/or the starting volume, is connected to a piston rod that leads to a cylinder assembly for moving the at least one control slide, and is guided relative to the compressor housing by means of a guide insert that movably receives the piston rod in the displacement direction, wherein the piston rod is guided transversely to the displacement direction in the guide insert in elastically resilient fashion by means of a guide element, and wherein a spring-elastic element is formed in a manner surrounding the guide element.

17. A screw compressor comprising:

a compressor housing with a screw rotor chamber arranged therein, two screw rotors, which are arranged in the screw rotor chamber, are mounted on the compressor housing so as to be rotatable about respective screw rotor axes, mesh with one another by means of their screw contours, and each cooperate with compression wall surfaces arranged adjacently to and partially enclosing the screw contours in order to receive a gaseous medium fed by means of a low-pressure chamber arranged in the compressor housing and discharge said medium in the region of a high-pressure chamber arranged in the compressor housing, wherein the gaseous medium is enclosed in compression chambers formed between the screw contours and the compression wall surfaces adjacent to the screw contours and is compressed from a starting volume at low pressure to high pressure at an end volume, at least one control slide, which is arranged in a slide channel of the compressor housing, adjacently to both screw rotors by means of slide compression wall surfaces, is movable in a displacement direction parallel to the screw rotor axes to influence the end volume and/or the starting volume, is connected to a piston rod that leads to a cylinder assembly for moving the at least one control slide, and is guided relative to the compressor housing by means of a guide insert that movably receives the piston rod in the displacement direction, wherein the piston rod is guided transversely to the displacement direction in the guide insert in elastically resilient fashion by means of a guide element, and wherein a movability of the piston rod transversely to the displacement direction is delimited by the guide insert.

18. A screw compressor in accordance with claim 17, wherein the movability of the piston rod transversely to the displacement direction is delimited by a delimiting element.

19. A screw compressor in accordance with claim 18, wherein the delimiting element, which delimits the movement of the piston rod transversely to the displacement direction, is arranged on a guide body of the guide insert.

20. A screw compressor in accordance with claim 19, wherein the delimiting element is formed by a delimiting region of the guide body.

21. A screw compressor in accordance with claim 17, wherein the guide element is elastically movable relative to a carrier body of the guide insert to a limited extent.

22. A screw compressor in accordance with claim 21, wherein the guide element is elastically movable transversely to the displacement direction to a limited extent by a delimiting element arranged on the carrier body of the guide insert.

23. A screw compressor in accordance with claim 22, wherein the delimiting element has a delimiting surface which faces the guide element and is arranged on the carrier body of the guide insert.

24. A screw compressor comprising:
- a compressor housing with a screw rotor chamber arranged therein,
- two screw rotors, which are arranged in the screw rotor chamber, are mounted on the compressor housing so as to be rotatable about respective screw rotor axes, mesh with one another by means of their screw contours, and each cooperate with compression wall surfaces arranged adjacently to and partially enclosing the screw contours in order to receive a gaseous medium fed by means of a low-pressure chamber arranged in the compressor housing and discharge said medium in the region of a high-pressure chamber arranged in the compressor housing, wherein the gaseous medium is enclosed in compression chambers formed between the screw contours and the compression wall surfaces adjacent to the screw contours and is compressed from a starting volume at low pressure to high pressure at an end volume,
- at least one control slide, which is arranged in a slide channel of the compressor housing, adjacently to both screw rotors by means of slide compression wall surfaces, is movable in a displacement direction parallel to the screw rotor axes to influence the end volume and/or the starting volume, is connected to a piston rod that leads to a cylinder assembly for moving the at least one control slide, and is guided relative to the compressor housing by means of a guide insert that movably receives the piston rod in the displacement direction,
- wherein the piston rod is guided transversely to the displacement direction in the guide insert in elastically resilient fashion by means of a guide element, and
- wherein a spring-elastic element is arranged in the guide insert in a closed chamber.

25. A screw compressor in accordance with claim 24, wherein the spring-elastic element is arranged in a receiving groove provided in a guide body of the guide insert.

26. A screw compressor in accordance with claim 24, wherein the spring-elastic element is arranged in a receiving groove provided in a carrier body of the guide insert.

* * * * *